United States Patent [19]

Simpson et al.

[11] Patent Number: 5,475,863
[45] Date of Patent: Dec. 12, 1995

[54] METHOD AND APPARATUS FOR DELIVERING MESSAGES TO PORTABLE COMMUNICATION UNITS IN A RADIO COMMUNICATION SYSTEM

[75] Inventors: Floyd Simpson, Boynton Beach; David F. Willard, Plantation; Jian C. Huang, Lake Worth, all of Fla.

[73] Assignee: Motorola, Inc., Schaumburg, Ill.

[21] Appl. No.: 131,243

[22] Filed: Oct. 4, 1993

[51] Int. Cl.[6] ............................................. H04B 7/00
[52] U.S. Cl. .................. 455/33.1; 455/56.1; 455/54.1; 455/53.1; 455/51.2; 379/59; 340/825.44
[58] Field of Search ................... 455/33.1, 53.1, 455/54.1, 54.2, 56.1, 67.1, 51.2, 51.1; 379/59; 340/825.44, 825.49; 342/457, 451, 463

[56] References Cited

U.S. PATENT DOCUMENTS

| | | |
|---|---|---|
| 4,875,038 | 10/1989 | Siwiak et al. . |
| 4,882,579 | 11/1989 | Siwiak . |
| 4,918,437 | 4/1990 | Jasinski et al. . |
| 4,968,966 | 11/1990 | Jasinski et al. . |
| 5,054,110 | 10/1991 | Comroe et al. ............ 455/54.1 |
| 5,124,697 | 6/1992 | Moore . |
| 5,153,582 | 10/1992 | Davis . |
| 5,162,790 | 11/1992 | Jasinski . |
| 5,218,716 | 6/1993 | Comroe et al. ............ 455/56.1 |

FOREIGN PATENT DOCUMENTS

| | | | |
|---|---|---|---|
| 0090736 | 3/1990 | Japan ................ | 455/33.1 |
| 0006929 | 1/1991 | Japan ................ | 45/33.1 |

OTHER PUBLICATIONS

Lee, W., Mobile Cellular Telecommunications Systems, 1989 pp. 78–79.

Primary Examiner—Reinhard J. Eisenzopf
Assistant Examiner—Doris To
Attorney, Agent, or Firm—James A. Lamb

[57] ABSTRACT

A method of locating a portable communication unit (108) having a transmitter (852) for transmitting acknowledge back signals, consists of the steps of transmitting, to the portable communication unit (108) from the communication cell transmitters (104), an information signal which consists of a predetermined color code word which identifies a subset of the communication cells (500) for which radio coverage does not overlap; receiving an acknowledge back signal from the portable communication unit (108) consisting of a reported color code value determined from the color code word transmitted in the information signal; and analyzing the reported color code value to determine a cell location of the portable communication unit (108). The portable communication unit (108) operates within a radio communication system consisting of communication cells (500) and a paging terminal (110), wherein the communication cells (500) consist of transmitters (104) for transmitting information signals intended for reception by the portable communication unit (108).

11 Claims, 10 Drawing Sheets

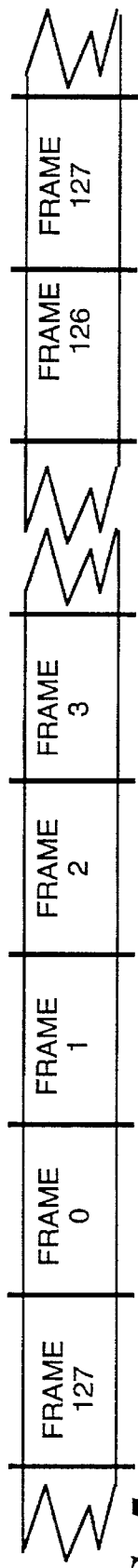
FIG. 5
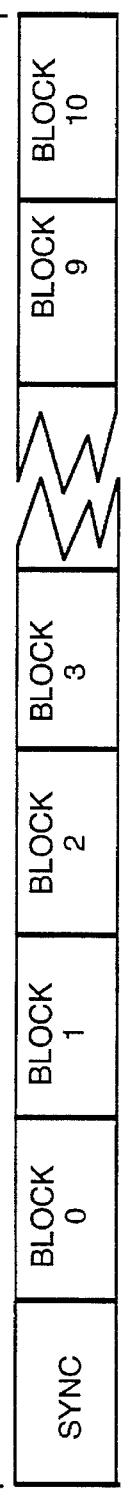
FIG. 6
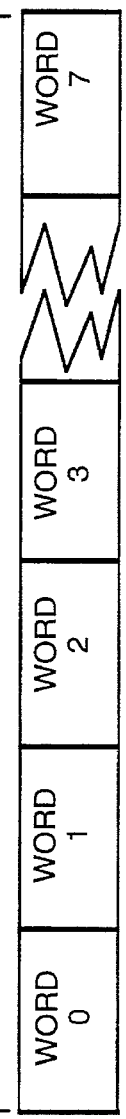
FIG. 7
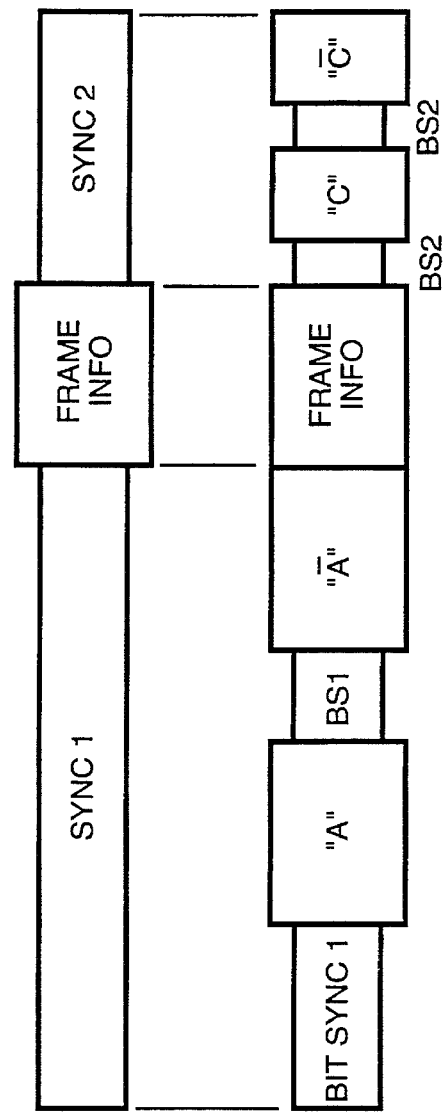
FIG. 8
FIG. 9

METHOD AND APPARATUS FOR DELIVERING MESSAGES TO PORTABLE COMMUNICATION UNITS IN A RADIO COMMUNICATION SYSTEM

FIELD OF THE INVENTION

This invention relates in general to radio communication systems and more specifically to methods and apparatus for identifying transmitters for re-use transmission in a two-way radio communication system.

BACKGROUND OF THE INVENTION

Radio communication systems that utilize simulcast transmissions are in wide use today. A typical example is a radio paging system. Simulcast transmissions, in which a single information signal is simultaneously transmitted from a plurality of geographically disperse transmitters to provide radio coverage over a wide geographic area, are employed in most wide area radio paging systems.

Whenever the number of users of a simulcast radio communication system increases within a given geographic coverage area, communication traffic can eventually reach the capacity limits of the system, and steps must be taken to increase the traffic capacity of the system before additional geographic coverage areas and users can be accommodated. One step that is often taken is to add another radio channel to the system. That step, is at best expensive, and may be impossible in some locations where all available channels are occupied.

Conventional radio paging systems, including acknowledge-back communication systems, have utilized simulcast fixed-to-portable radio transmissions that operate ubiquitously, i.e., simulcasting substantially every fixed-to-portable communication from substantially every fixed transmitter in the system. If, however, there could be found a way of locating portable communication units as they move about the system, then the number of base transmitters and receivers utilized for communications with any one individual portable communication unit could be isolated only to those fixed transmitters and receivers near each portable communication unit. This isolation would allow simultaneous reuse of base transmitters, receivers, and communication spectrum for additional communication with other portable communication units in other parts of the geographic coverage area of the system on the same radio channel.

Thus, what is needed is a method and apparatus for increasing the capacity limits of a simulcast radio communication system in a manner that does not require an additional radio channel.

SUMMARY OF THE INVENTION

Accordingly, in a first aspect of the preferred embodiment of the present invention, a method of locating a portable communication unit having a transmitter for transmitting acknowledge back signals comprises the steps of transmitting an information signal, receiving an acknowledge back signal including a reported color code word, and analyzing the color code word. The portable communication unit operates within a radio communication system comprising a plurality of communication cells and a paging terminal, wherein the communication cells comprise one or more transmitters for transmitting information signals intended for reception by the portable communication unit. The transmitting step consists of transmitting, to the portable communication unit from the communication cell transmitters, an information signal which comprises one of a plurality of predetermined color code words which identify subsets of the plurality of communication cells for which radio coverage does not overlap. The receiving step consists of receiving an acknowledge back signal from the portable communication unit comprising a reported color code value determined from the color code word transmitted in the information signal. The analyzing step consists of analyzing the reported color code value to determine a cell location of the portable communication unit.

In a second aspect of the preferred embodiment of the present invention, a method in a portable communication unit, of identifying one of the subsets of a plurality of communication cells for which radio coverage does not overlap, comprises the steps of receiving the information signal, decoding a predetermined color code word, and transmitting an acknowledgment. The portable communication unit has a transmitter for transmitting acknowledge back signals, and operates within a radio communication system comprising a plurality of communication cells and a paging terminal, and the communication cells comprise one or more transmitters for transmitting an information signal intended for reception by the portable communication unit. The step of receiving the information signal consists of receiving at the portable communication unit the transmitted information signal comprising one of a plurality of predetermined color code words which identify subsets of the plurality of communication cells for which radio coverage does not overlap, wherein the information signal as received includes induced errors. The step of decoding a predetermined color code word consists of decoding from the information signal including errors, received in said receiving step, the predetermined color code word transmitted in the information signal. The step of transmitting an acknowledgment consists of transmitting from the portable communication unit an acknowledge back signal comprising a reported color code value for the color code word decoded in said decoding step.

In a third aspect of the preferred embodiment of the present invention, a system comprises a transmitter controller, a receiving controller, and an assignment means. The system is for locating a portable communication unit which has a transmitter for transmitting acknowledge back signals and operates within a radio communication system, wherein the radio communication system comprises a plurality of communication cells and a paging terminal, and wherein the communication cells comprise one or more transmitters for transmitting information signals intended for reception by the portable communication unit and one or more fixed receivers for receiving an acknowledge back signal from the portable communication unit and forwarding the acknowledge back signal to the paging terminal. The transmitter controller means is coupled to the one or more transmitters for transmitting an information signal which comprises one of a plurality of predetermined color code words which identify subsets of the plurality of communication cells for which radio coverage does not overlap. The receiving controller means is coupled to the fixed receivers for receiving the acknowledge back signal from the portable communication unit comprising a reported color code value determined from the color code word transmitted in the information signal. The assignment means is coupled to the receiver controller means for analyzing the acknowledge back signal for reported color code values and fixed receiver identification to determine a cell location of the portable communication unit.

In a fourth aspect of the preferred embodiment of the present invention, a portable communication unit comprises a demodulator means, a sync correlator means, and a reporter means. The portable communciation unit has a radio frequency (RF) receiver and an RF transmitter for transmitting acknowledge back signals, and operates within a radio communication system comprising a plurality of communication cells and a paging terminal, wherein the communication cells comprise one or more transmitters for transmitting an information signal intended for reception by the portable communication unit. The demodulator means is coupled to the RF receiver for demodulating the information signal comprising one of a plurality of predetermined color code words which identify subsets of the plurality of communication cells for which radio coverage does not overlap, and wherein the information signal as received includes induced errors. The sync correlator means is coupled to the demodulator means for decoding from the received information signal the color code word transmitted within the information signal. The reporter means is coupled to the decoder means for generating an acknowledge back signal which reports the decoded color code value.

BRIEF DESCRIPTION OF THE DRAWINGS

FIGS. 5–7 are timing diagrams illustrating the transmission format of the signaling protocol utilized in accordance with the preferred embodiment of the present invention.

FIGS. 8 and 9 are timing diagrams illustrating the synchronization signals utilized in accordance with the preferred embodiment of the present invention.

DETAILED DESCRIPTION OF THE INVENTION

A method and apparatus for identifying communication cells within an acknowledge-back radio communication system is described herein below, in accordance with the preferred embodiment of the present invention. The method and apparatus can be utilized for locating portable communication units to achieve the advantages of transmitter, receiver, and spectrum reuse.

Figure 1:
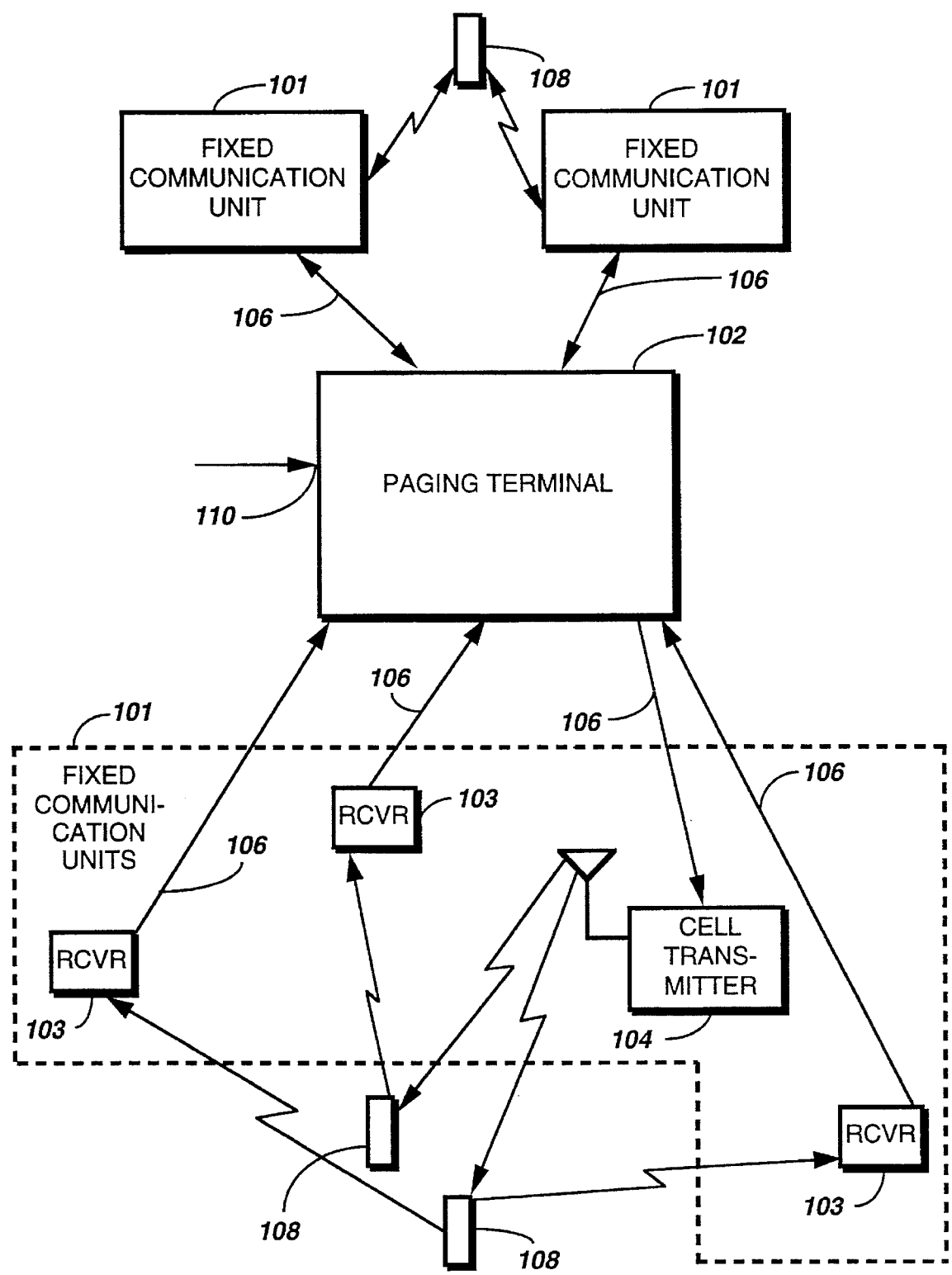
FIG. 1 is an electrical block diagram of a radio communication system in accordance with the preferred embodiment of the present invention.

Referring to FIG. 1, an electrical block diagram of a radio communication system 100 in accordance with the preferred embodiment of the present invention comprises a paging terminal 102 one or more telephone inputs 110 for interfacing with the Public Switched Telephone Network in a manner well known in the art. Preferably, the paging terminal 102 is similar to a model E09DAB0010 Metro-Page® paging terminal manufactured by Motorola, Inc. of Schaumburg, Ill., modified with special firmware elements in accordance with the preferred embodiment of the present invention, as described herein below. It will be appreciated that other similar equipment may be used as well for the paging terminal 102.

The paging terminal 102 is coupled to a plurality of fixed communication units 101, preferably by a plurality of telephone lines 106. It will be appreciated that radio links can be used as well to couple the paging terminal 102 with the fixed communication units 101. Each of the fixed communication units 101 provides radio coverage within one of a plurality of communication cells 500 (FIG. 2) of the radio communication system 100, as will be further defined herein below.

The fixed communication units 101 preferably each comprises one or more fixed receivers 103 positioned in geographically disperse locations within a communication cell, and a cell transmitter 104. The cell transmitter 104 and the plurality of receivers 103 are coupled by radio links with a plurality of portable communication units 108, preferably radio pagers having acknowledge-back capability, for sending and receiving information to and from the portable communication units 108. Radio pagers having such acknowledge-back capability are disclosed in U.S. Pat. Nos. 5,124,697 to Moore, entitled "Acknowledge Back Pager," 5,153,582 to Davis, entitled "Method and Apparatus for Acknowledging and Answering a Paging Signal," and 4,875,038 to Siwiak et al., entitled "Frequency Division Multiplexed Acknowledge Back Paging System." Preferably, the cell transmitter 104 is similar to a model C73 PURC 5000® transmitter manufactured by Motorola, Inc. of Schaumburg, Ill. It will be appreciated that other similar transmitters may be used as well for the cell transmitter 104. The plurality of receivers 103 and the portable communication units 108 will be described in further detail herein below. It will be appreciated that the portable communication units 108 could also have capabilities of full two way (receive and transmit) digital messaging.

During initial setup of the radio communication system 100, the paging terminal 102 preferably defines and assigns identification codes hereinafter called color codes (CC's) for each of the communication cells 500, as well as unique transmitter identification codes (TID's) for each transmitter 104 and unique fixed receiver identification codes (RID's) for each fixed receiver 103, in accordance with the preferred embodiment of the present invention. During subsequent operation of the radio communication system 100, callers preferably place telephone calls to the central controller 102 through the telephone inputs 110 to request that specific ones of the portable communication units 108 be signaled, thereby forming a random group of portable communication units 108 to be signaled. Preferably, the callers are using a suitable input device, e.g., a tone dialing telephone or an alphanumeric page entry device, so that a message, e.g., a call-back number, is entered as well. The paging terminal 102 preferably formats and queues a plurality of selective call addresses and associated messages corresponding to the random group for subsequent transmission.

Next, the paging terminal 102 formats acknowledgment assignment information along with the queued selective call addresses and messages, the acknowledgment assignment information preferably comprising instructions for each member of the random group, designating a time and a channel to be utilized for the acknowledgment signal. The paging terminal 102 then forwards the selective call addresses and associated messages and acknowledgment assignment information to the transmitters 104 of the fixed communication units 101 in a manner well known in the art. One or more of the transmitters 104 transmits, or simulcasts (simultaneously transmits), in the case of more than one transmitter) the selective call addresses and associated information, comprising the messages and acknowledgment assignment information, to the portable communication units 108 using the paging protocol described herein below, on a paging channel. In addition, the paging terminal 102 controls each of the transmitters 104 to periodically transmit the color code assigned to the communication cell 500 in which the cell transmitter 104 is located. Each assigned color code defines a non-interfering subset of the plurality of communication cells 500, as will be described herein, below.

In response to the portable communication unit 108 receiving the signal containing the selective call address, message information, and acknowledgment assignment information, and finding that the selective call address matches a selective call address programmed therein, the portable communication unit 108 further receives the associated information and transmits an acknowledgment signal at a designated time on a designated channel. The acknowledgment signal comprises at least a reported value of the transmitter color identified from the last received transmission in accordance with the preferred embodiment of the present invention, and the RID, as will be further described herein below.

The design of the radio communication system is such that the acknowledgment signal is received with substantial certainty by one or more of the fixed receivers 103. The reported color code value received at the one or more fixed receivers 103 from the portable communication unit 108 is forwarded along with the RID by the fixed receivers 103 to the paging terminal 102, along with the time slot and channel information.

The paging terminal then determines the best cell of the plurality of communication cells 500 by reference to a stored best cell table 254 (FIG. 3) which cross references all the communication cells 500 to all color codes and all fixed receivers 10. The paging terminal 102 preferably selects the determined best cell for further communications with the reporting portable communication unit 108, while terminating further transmissions from all other communication cells 500 in accordance with the preferred embodiment of the present invention, thereby permitting all other non-interfering cells to be re-used simultaneously on a non-interfering basis for communications with other portable communication units 108.

It will be appreciated that the minimum number of cell transmitters 104 utilized for each of the communication cells 500 is one. Still, for system robustness, it is preferable that more than one transmitter 104 can be utilized in one or more of the plurality of communication cells 500, for example, in certain geographic situations where two antenna sites are necessary to cover a contiguous cell area, and, for example, for redundancy purposes. When two or more transmitters 104 are used within one of the communication cells 500, the transmitters 104 transmit the same color code.

Figure 2:
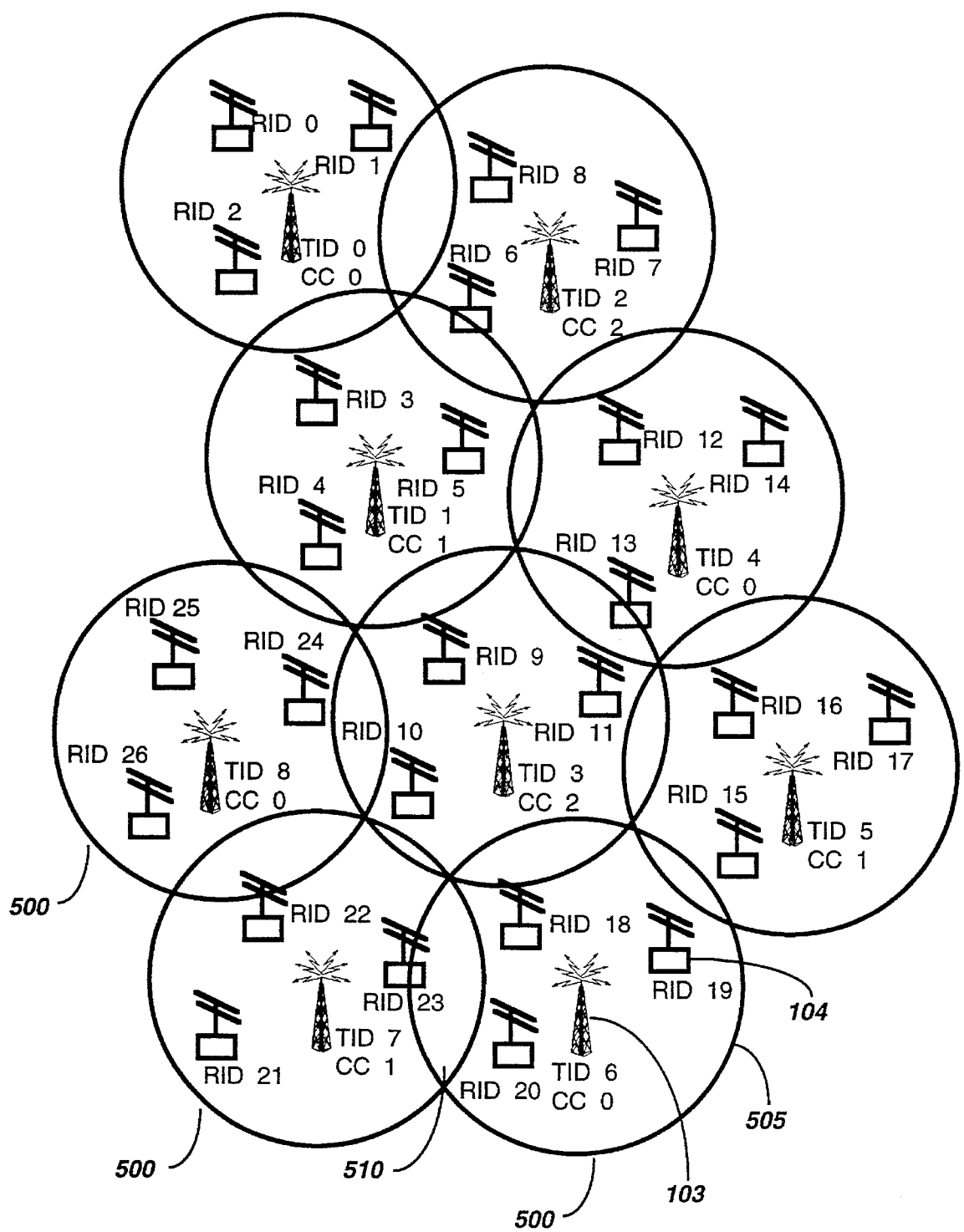
FIG. 2 is a pictorial diagram depicting communication cells of the radio communication system in accordance with the preferred embodiment of the present invention.

FIG. 2 is a pictorial diagram depicting, for a nine cell example, the communications cells 500 of the radio system 100 in accordance with the preferred embodiment of the present invention. The approximate coverage peripheries of the communication cells 500 are represented by a circular boundary 505. In each communication cell 500, one transmitter 104 and three receivers 103 are shown by way of example. Next to each transmitter, the TID and the color code (CC), which are assigned at the time of initial system setup, are shown. Next to each fixed receiver 103, the RID is shown. At the time of assignment, the color codes are selected to provide the ability to distinguish the signals received by the portable communication unit 108 simultaneously from transmitters 104 located in different communication cells 500, and in the coverage overlap regions 510 of interfering cells. These regions are the areas where the capture effect, well known in the art of FM radio communications, does not occur reliably from any one of the transmitters 104 as the signals are often of similar strength within the region. While in this example three color codes are sufficient to provide the capability to distinguish different communication cells, it will be appreciated that other quantities of color codes can be used also.

It will be appreciated that the radio communication system can be either a simulcast communication system, wherein the timing of transmissions is adjusted so that signals received in the overlap areas are simultaneous to within a small part of an information symbol, thereby increasing the probability of receiving a message when two of the same signals of similar strength are received from two or more transmitters, or a conventional system wherein such timing refinements are not necessarily undertaken.

It will be appreciated that the use of circles as the cell coverage periphery is a simplification of the actual coverage peripheries found in typical systems, which does not substantially affect the conclusions of this system description.

Figure 3:
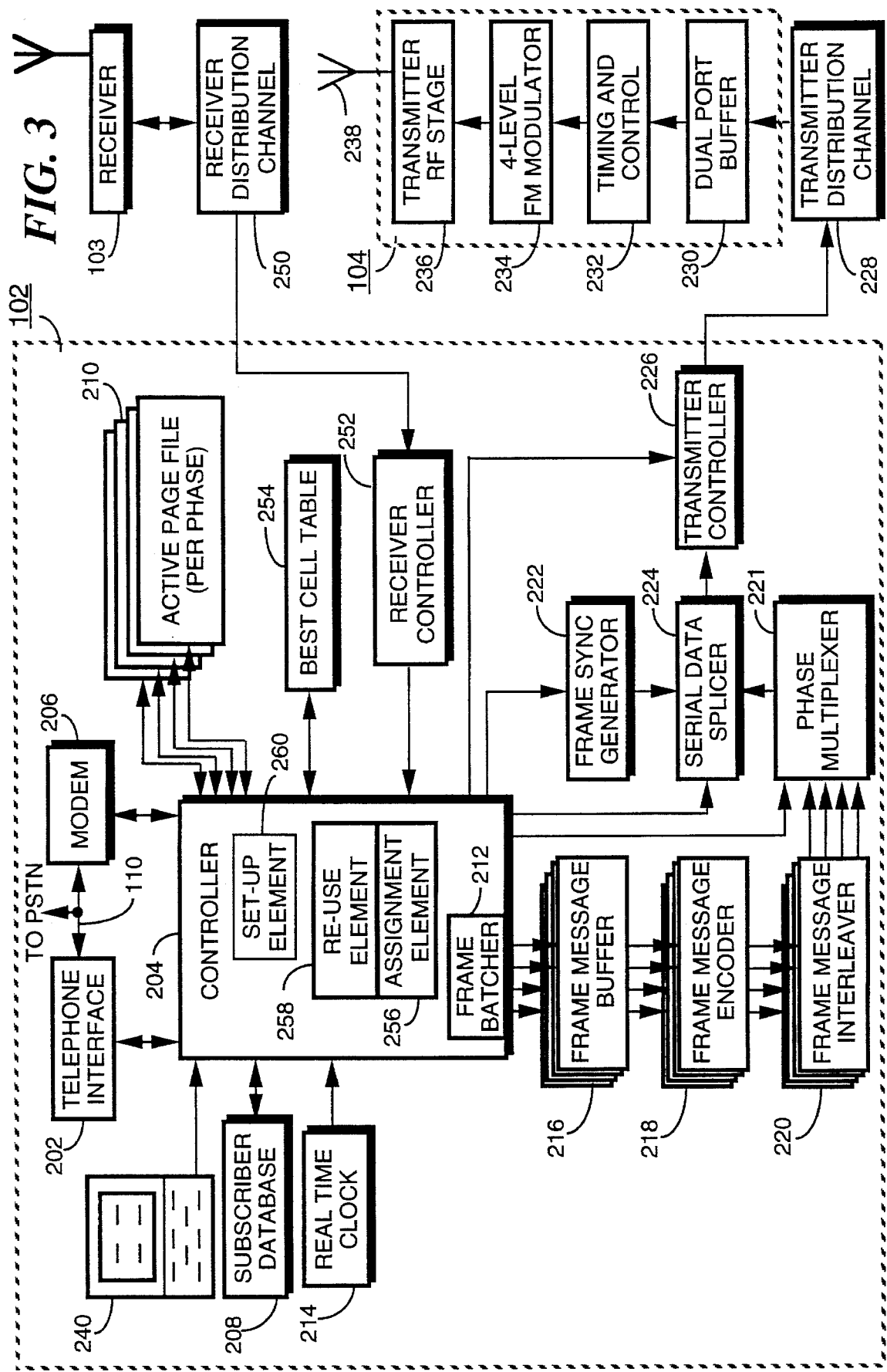
FIG. 3 is an electrical block diagram of a terminal and transmitter for processing and transmitting message information in accordance with the preferred embodiment of the present invention.

FIG. 3 is an electrical block diagram of the paging terminal 102 and transmitter 104 utilized for processing and controlling the transmission of the message information in accordance with the preferred embodiment of the present invention. An assignment element 260 is used at the time of system initialization for setting up the RID's, the TID's, the subscriber data base 208, the cell color codes, and the best cell table 254, described further herein, below. Short messages, such as tone-only and numeric messages which can be readily entered using a Touch-Tone telephone are coupled to the paging terminal 102 from the telephone input connection 110 through a telephone interface 202 in a manner well known in the art. Longer messages, such as alphanumeric messages which require the use of a data entry device are coupled to the paging terminal 102 from the public switched telephone network input/output connection 110 through a modem 206 using any of a number of well known modem transmission protocols. When a call to place a message is received, a controller 204 handles the processing of the message. The controller 204 is preferably a microcomputer, such as an MC68000 or equivalent, which is manufactured by Motorola Inc., of Schaumburg, Ill., and which runs various pre-programmed routines for controlling such terminal operations as voice prompts to direct the caller to enter the message, or the handshaking protocol to enable reception of messages from a data entry device. When a call is received, the controller 204 references information stored in the subscriber data base 208 to determine how the message being received is to be processed. The subscriber data base 208 includes, but is not limited to such information as addresses assigned to the portable communication unit 108, message type associated with the address, and information related to the status of the portable communication unit 108, such as active or inactive for failure to pay the bill. A data entry terminal 240 is provided which couples to the controller 204, and which is used for such purposes as entry, updating and deleting of information stored in the subscriber data base 208, for monitoring system performance, and for obtaining such information as billing information.

The subscriber data base 208 also comprises such information as a transmission frame assignment, a transmission phase assignment, the acknowledgment assignment, and the time and cell identification of the last cell location of the portable communication unit 108, as will be described in further detail below. The received message is stored in an active page file 210 which stores the messages in queues according to the transmission phase assigned to the portable communication units 108. In the preferred embodiment of the present invention, four phase queues are provided in the active page file 210 for messages to be simulcast on transmitters 104, as well as four additional phase queues for each cell, for messages which are to be individually transmitted within a communication cell 500. The active page file 210 is preferably a dual port, first in first out random access memory, although it will be appreciated that other random access memory devices, such as hard disk drives, can be utilized as well. Periodically the message information stored in each of the phase queues is recovered from the active page file 210 under control of controller 204 using timing information such as provided by a real time clock 214, or other suitable timing source. The recovered message information from each phase queue is sorted by frame number and is then organized by address, message information, and any other information required for transmission, and then batched into frames based upon message size and cell identification, for the phase queues associated with individual cells, by frame batching controller 212. The batched frame information for each phase queue is coupled to frame message buffers 216 which temporarily store the batched frame information until a time for further processing and transmission. Frames are batched in numeric sequence, so that while a current frame is being transmitted, the next frame to be transmitted is in the frame message buffer 216, and the next frame thereafter is being retrieved and batched. The controller 204 identifies phase queues that are associated with individual, non-overlapping cells for simultaneous transmission. At the appropriate time, the batched frame information stored in the frame message buffer 216 is transferred to a frame encoder 218, again maintaining the phase queue relationship. The frame encoder 218 encodes the address and message information into address and message code words required for transmission, as will be described below. The encoded address and message code words are ordered into blocks and then coupled to a frame message interleaver 220 which interleaves preferably eight code words at a time for transmission in a manner well known in the art. The interleaved code words from each frame message interleaver 220 are then serially transferred to a phase multiplexer 221, which multiplexes the message information on a bit by bit basis into a serial data stream by transmission phase. The controller 204 next enables a frame sync generator 222 which generates a synchronization code which is transmitted at the start of each frame transmission. The synchronization code is multiplexed with address and message information under the control of controller 204 by a serial data splicer 224, and generates therefrom a message stream which is properly formatted for transmission. The message stream is next coupled to a transmitter controller 226, which under the control of controller 204 transmits the message stream over a transmitter distribution channel 228. The transmitter distribution channel 228 may be any of a number of well known distribution channel types, such as wire line, a radio frequency (RF) or microwave distribution channel, or a satellite distribution link. The distributed message stream is transferred to one or more transmitter stations 104, depending upon the size of the communication system. The message stream is first transferred into a dual port buffer 230 which temporarily stores the message stream prior to transmission and modifies the synchronization portion of the message stream, as further described herein, below, to include the color code assigned to the cell in which the transmitter 104 is located. At an appropriate time determined by timing and control circuit 232, the message stream is recovered from the dual port buffer 230 and coupled to the input of preferably a 4-level frequency shift keyed (FSK) modulator 234. The modulated message stream is then coupled to the transmitter RF stage 236 for transmission via antenna 238. It will be appreciated that the modification of the synchronization portion of the message to include the color code unique to the transmitter 104 could equally be done in the timing and control circuit 232 of the transmitter 104.

When the portable communication unit 108 receives a paging transmission, the portable communication unit 108 responds with an acknowledgment as described above. The decoded color code received in the acknowledgment from the portable communication unit 108 by the one or more fixed receivers 103 is forwarded along with the receiver identification through a receiver distribution channel 250 from the fixed receivers 103 to a receiver controller 252 in the paging terminal 102, along with time slot and channel information. The receiver controller 252 buffers the information for reception and decoding by the controller 204. Within the controller 204, an assignment element 256 uses the time slot and channel information to identify the portable communication unit 108, and uses the decoded color code, the fixed receiver 103 identification, and the best cell table 254 to determine the cell site location of the portable communication unit 108. The cell location for the portable communication unit 108 is then updated in the subscriber data base 208 by the assignment element 256.

An example of the contents of the best cell table 254 is given below, in Table 1, in accordance with the preferred embodiment of the present invention. Four color code values are listed across the right columns of the Table 10. Three of the values, 0, 1, and 2, are assigned to the communication cells 500 at the time of system initialization in accordance with the cell geography of FIG. 2. The fourth value, 15, is named the non-valid color code value, and is a unique color code value reported by the portable communication unit 108 when it cannot identify with substantial certainty one of the three color codes transmitted in the synchronization portion of messages. The fixed receiver identifications (RID's) are listed in the left column of the table. Cell identification numbers, which in this example are the same as the transmitter ID's (TID's) comprise the body of the table. When a color code value and RID are provided as inputs to the best cell table 254, a TID is output as the cell location of the portable communication unit 108. When no acknowledgment response has been received from the portable communications unit 108, as at the time of system initialization, a unique non-valid cell location, 999, is assigned.

Figure 4:
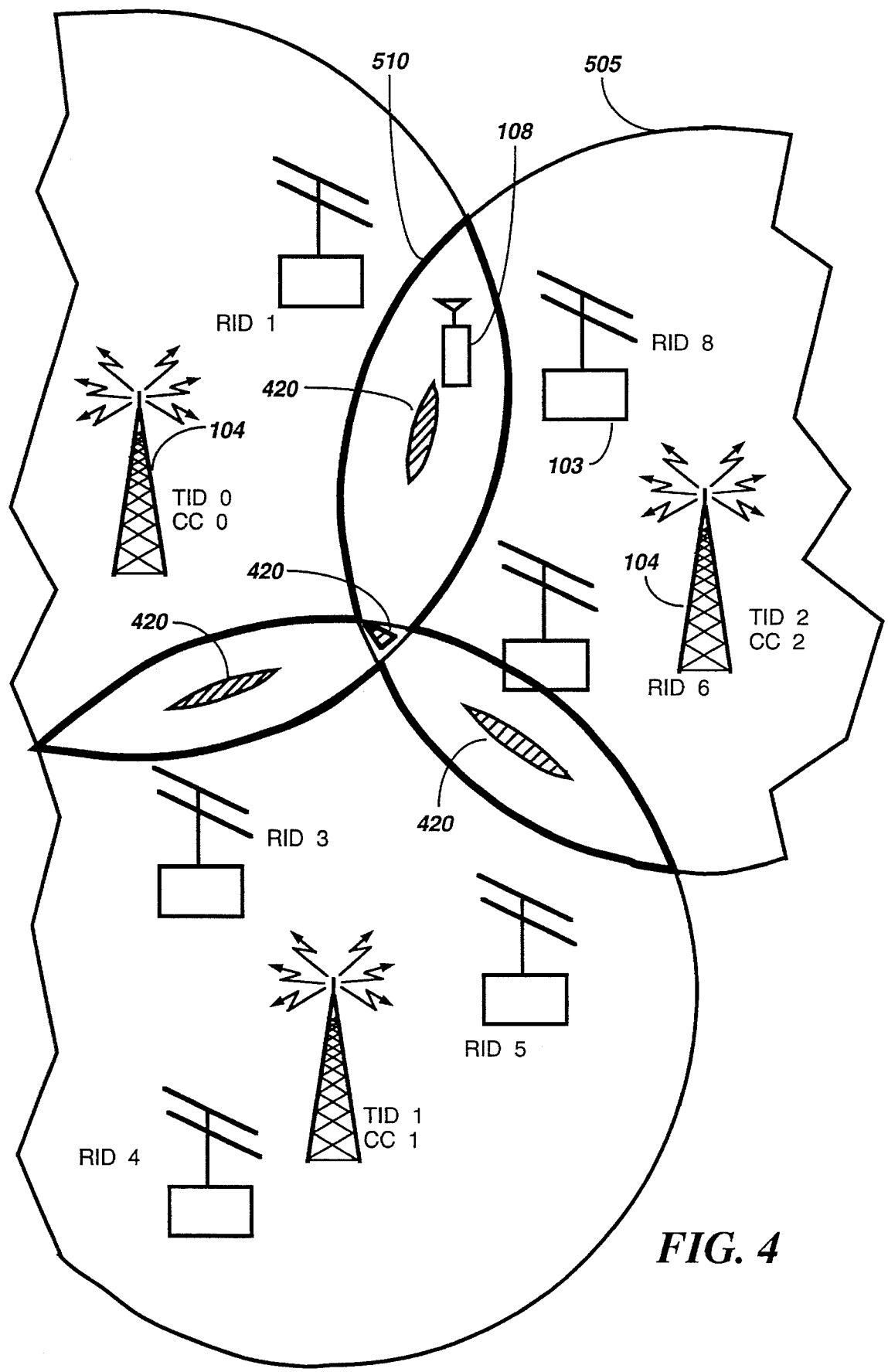
FIG. 4 is a pictorial diagram depicting a portion of the communication cells of the radio communication system in accordance with the preferred embodiment of the present invention.

FIG. 4, is a pictorial diagram of a portion of the communication cells 500 with TID's 0, 1 and 2, in accordance with the preferred embodiment of the present invention. In this example, the portable communication unit 108 receives transmissions of a paging message simultaneously from the transmitters 104 with TID 0 and TID 2. The signal from the transmitter 104 with TID 2 is slightly stronger than that from the transmitter 104

TABLE 1

| RECEIVER IDENTIFICATION | COLOR CODE | | | |
| --- | --- | --- | --- | --- |
| | 0 | 1 | 2 | 15 |
| 0 | 0 | 1 | 2 | 0 |
| 1 | 0 | 1 | 2 | 0 |
| 2 | 0 | 1 | 2 | 0 |
| 3 | 0 | 1 | 2 | 1 |
| 4 | 8 | 1 | 3 | 1 |
| 5 | 4 | 1 | 2 | 1 |
| 6 | 0 | 1 | 2 | 2 |
| 7 | 4 | 4 | 2 | 2 |
| 8 | 0 | 1 | 2 | 2 |
| 9 | 4 | 1 | 3 | 3 |
| 10 | 6 | 7 | 3 | 3 |
| 11 | 4 | 5 | 3 | 3 |
| 12 | 4 | 1 | 2 | 4 |
| 13 | 4 | 5 | 3 | 4 |
| 14 | 4 | 5 | 2 | 4 |
| 15 | 6 | 5 | 3 | 5 |
| 16 | 4 | 5 | 3 | 5 |
| 17 | 4 | 5 | 3 | 5 |
| 18 | 6 | 7 | 3 | 6 |
| 19 | 6 | 5 | 3 | 6 |
| 20 | 6 | 7 | 3 | 6 |
| 21 | 8 | 7 | 3 | 7 |
| 22 | 8 | 7 | 3 | 7 |
| 23 | 6 | 7 | 3 | 7 |
| 24 | 8 | 1 | 3 | 8 |
| 25 | 8 | 1 | 3 | 8 |
| 26 | 8 | 7 | 3 | 8 | with TID 0, so that the portable communication unit 108 decodes and reports color 2 in the acknowledgment, in a manner that is described herein, below. The acknowledgment from the portable communication unit 108 is received by the paging terminal 102 through fixed receiver 103 with RID 8 and a color code of 2, and from fixed receiver 103 with RID 1 and a color code of 2. The association of cell 2 with the portable communication unit 108 is then made in the subscriber data base as the location of the unit. It will be appreciated that the use of the decoded color code allows the correct identification of the stronger transmitter 104 in an area where capture does not occur, effectively reducing the regions of ambiguity from the large coverage overlap regions 510 to much smaller regions (color overlap regions) 420. It will also be appreciated that in a non-ideal system, the shape and number of non-capture regions 510 and color overlap regions 420 would likely be more complicated, but the significant difference in the amount of areas covered would still exist.

In the present instance, the cell identifications are identical to the transmitter TID numbers. In situations other than the present instance, where more than one transmitter is in a cell, there are differences between the cell identification numbers and the transmitter numbers.

When the assignment element 256 has updated the subscriber data base 208 with the cell location of the portable communication unit 108 as described above, a re-use element 258 causes all subsequent message transmissions to be sent to the portable communication unit 108 only from the located cell until an exception condition arises, such as lack of response from the portable communication unit 108 through any fixed receivers 103 for a predetermined time duration. In the preferred embodiment of the present invention, when this conditions arises, the assignment element 256 assigns the non-valid location 999 to the portable communication unit 108 and the re-use element 258 will cause transmissions to the portable communications unit 108 to be re-use transmitted, simultaneously from all cells in a simulcast radio communication system, or re-use transmitted simultaneously from all subsets of the communication cells having the same color code, one subset at a time, sequentially, in a conventional radio communication system, until a new location for the portable communication unit 108 is determined. Another exception condition causing a change to occur to the assigned cell location for a portable communication unit 108 is the receipt of acknowledgments, indicating that the portable communication unit 108 is in another cell. In this instance, the assignment element 256 changes the cell location in the subscriber data base 208 to the new cell location and the re-use element 258 terminates communications from all cells but the new one. Re-use transmissions of different messages simultaneously to different portable communication units are controlled, by the re-use element 258, to be transmitted only from cells with the same color codes.

It will be appreciated that there is an alternative embodiment of the present invention in which at least a portion of the best cell table is duplicated in the receivers 103, the cell location determination is done within the receiver 103, the cell location is forwarded to the paging terminal 102, wherein the assignment element 256 then updates the subscriber data base 208 as described above.

FIGS. 5, 6 and 7 are timing diagrams illustrating the transmission format of the signaling protocol utilized in accordance with the preferred embodiment of the present invention. As shown in FIG. 5, the signaling protocol enables message transmission to portable communication units 108, such as pagers, assigned to one or more of 128 frames which are labeled frame 0 through frame 127. It then will be appreciated that the actual number of frames provided within the signaling protocol can be greater or less than described above. The greater the number of frames utilized, the greater the battery life that may be provided to the portable communication units 108 operating within the system. The fewer the number of frames utilized, the more often messages can be queued and delivered to the portable communication units 108 assigned to any particular frame, thereby reducing the latency, or time required to deliver messages.

As shown in FIG. 6, the frames comprise a synchronization code (sync) followed preferably by eleven blocks of message information which are labeled block 0 through block 10. As shown in FIG. 7, each block of message information comprises preferably eight address, control or data code words which are labeled word 0 through word 7 for each phase. Consequently, each phase in a frame allows the transmission of up to eighty-eight address, control and data code words. The address, control and data code words are preferably 31,21 Bose, Chaudhuri, Hocquenghem (BCH) code words with an added thirty-second even parity bit which provides an extra bit of distance to the code word set. It will be appreciated that other code words, such as a 23,12 Golay code word or other block codes providing robust error correction and detection could be utilized as well. Unlike the well known POCSAG signaling protocol which provides address and data code words which utilize the first code word bit to define the code word type, as either address or data, no such distinction is provided for the address and data code words in the signaling protocol utilized with the preferred embodiment of the present invention. Rather, address and data code words are defined by their position within the individual frames. It will be also be appreciated that quantities of blocks per frame other than eleven could be used FIGS. 8 and 9 are timing diagrams illustrating the synchronization code utilized in accordance with the preferred embodiment of the present invention. In particular, as shown in FIG. 8, the synchronization code comprises preferably three parts, a first synchronization code (sync 1), a frame information code word (frame info) and a second synchronization code (sync 2). As shown in FIG. 9, the first synchronization code comprises a first portion labeled bit sync 1, which is preferably an alternating 1,0 bit pattern which provides bit synchronization, second and fourth portions, labeled "A" and its complement "A bar", which provide frame synchronization, and a third portion, labeled "BS1", which provides further bit synchronization as well as the color code. The second and fourth portions are preferably single 32,21 BCH code words which are predefined to provide high code word correlation reliability, and which are also used to indicate the data bit rate at which addresses and messages are transmitted. Table 2 below defines the data bit rates which are used in conjunction with the signaling protocol.

TABLE 2

| Bit Rate | "A" Value |
|---|---|
| 1600 bps | A1 and A1 bar |
| 3200 bps | A2 and A2 bar |
| 6400 bps | A3 and A3 bar |
| Not defined | A4 and A4 bar |

As shown table 2 above, three data bit rates are predefined for address and message transmission, although it will be appreciated that more or less data bit rates can be predefined as well, depending upon the system requirements. A fourth "A" value is also predefined for future use.

The third portion of the first synchronization code, hereinafter referred to as the color code portion of the first synchronization code, is preferably one of a predetermined small subset of 16,5 BCH, 3 error correcting code words. The subset is selected to provide not only a small set of different error correcting transmitter color codes but also to provide bit synchronization and a high degree of anticorrelation with the bit sequences pre-defined as the "A" and "A bar" frame synchronization sequences (at least 6 bits of Hamming distance for all sliding comparisons with the "A", and "A bar" codes in the present instance), thereby providing codes that allow correct decoding of the color code contained in a signal containing bit errors, such as a signal only slightly stronger than other like signals containing different color codes which are received simultaneously, producing bit errors in the color code portion of the first synchronization code, or in a weak signal not necessarily interfered with other like signals, but having bit errors due to RF background noise or other interference. A simulation of the performance of the error correction improvement provided by the 16,5 BCH code of the present invention shows a typical improvement of correctly decoding the color code in the stronger signal 99% of the time with 3 dB difference in the signals versus 75% of the time with a 4.5 dB difference, without the use of a block error correcting code.

The frame information code word is preferably a single 32,21 BCH code word which includes within the data portion a predetermined number of bits reserved to identify the frame number, such as 7 bits encoded to define frame number 0 to frame number 127.

The structure of the second synchronization code is preferably similar to that of the first synchronization code described above. However, unlike the first synchronization code which is preferably transmitted at a fixed data symbol rate, such as 1600 bps (bits per second), the second synchronization code is transmitted at the data symbol rate at which the address and messages are to be transmitted in any given frame. Consequently, the second synchronization code allows the portable communication unit 108 to obtain "fine" bit and frame synchronization at the frame transmission data bit rate.

In summary the signaling protocol utilized with the preferred embodiment of the present invention comprises 128 frames which include one of several predetermined synchronization codes followed by eleven data blocks which comprise eight address, control or message code words per phase. The synchronization code enables identification of the data transmission rate, the transmitter color code, and insures synchronization by the portable communication unit 108 with the data code words transmitted at the various transmission rates.

Figure 10:
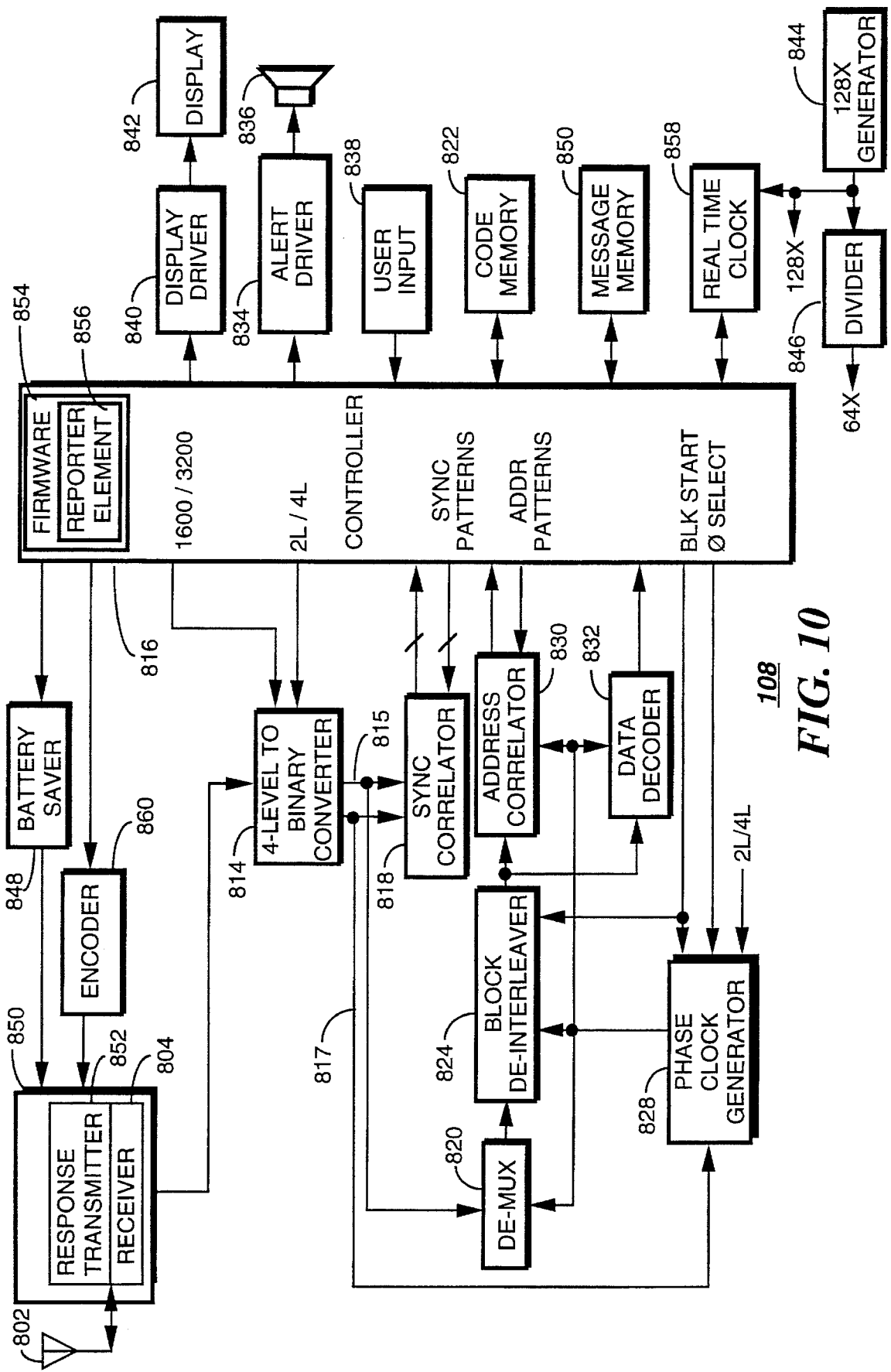
FIG. 10 is an electrical block diagram of a portable communication unit in accordance with the preferred embodiment of the present invention.

FIG. 10 is an electrical block diagram of the portable communication unit 108 in accordance with the preferred embodiment of the present invention. The heart of the portable communication unit 108 is a controller 816, which is preferably implemented using an MC68HC05HC11 microcomputer, such as manufactured by Motorola, Inc., of Schaumburg, Ill. The microcomputer controller, hereinafter call the controller 816, receives and processes inputs from a number of peripheral circuits, as shown in FIG. 10, and controls the operation and interaction of the peripheral circuits using software subroutines. The controller comprises an electrically alterable read only memory (EAROM) firmware 854 which provides a set of program instructions. It will be appreciated that masked read-only memory (ROM), battery-backed-up RAM, and other similar forms of electrically-reprogrammable non-volatile memory may be substituted as well for the EAROM firmware 854. The use of a microcomputer controller for processing and control functions is well known to one of ordinary skill in the art.

The portable communication unit 108 is capable of receiving address, control and message information, hereafter called "data" which is modulated using preferably 2-level and 4-level frequency modulation techniques, and can encode and transmit acknowledgment responses to the received messages. The portable communication unit 108 comprises an antenna 802 for intercepting the data signal which is transmitted from one or more cell transmitters 104 and for returning a response to the plurality of receivers 103. The antenna 802 is coupled to a transceiver 850 comprising a receiver 804 for demodulating the intercepted radio signal, and a response transmitter 852 for transmitting the acknowledgment. Preferably, the response transmitter 852 is a conventional low-power, narrowband, binary FSK transmitter, and the receiver 804 is similar to the receiver used in the model A03KLB5962CA ADVISOR® pager manufactured by Motorola, Inc. of Schaumburg, Ill. It will be appreciated that other similar receivers can be used as well for the receiver 804, The receiver 804 provides at the output an analog 4-level recovered data signal, hereafter called a recovered data signal, which is coupled to a 4-level to binary demodulator 814. Two control signals, 1600/3200 and 2L/4L are also coupled to inputs of the 4-level to binary demodulator, from the controller 816. The control signals are maintained in a default state (1600 bits per second and 2 level) until the portable communications unit has established synchronization with received signals, at which time the control signals change to the symbol rate and level state used for blocks of message information. Using techniques well known to those skilled in the art, the 4-level to binary demodulator 814 demodulates the recovered data signal and generates a data output 815 which is coupled to a sync correlator 818 and a block de-interleaver 824. The 4-level to binary demodulator also generates clocks 817 at the symbol rate and twice the symbol rate which are coupled to the phase selector 828.

The serial binary data stream generated by the 4-level to binary demodulator 814 is coupled to inputs of the synchronization word correlator 818 and a de-multiplexer 820. The synchronization word correlator is best understood with reference to FIG. 11. Predetermined "A" word synchronization patterns are recovered by the controller 816 from a code memory 822 and are coupled to an "A" word correlator 1310 shown in FIG. 11. When the synchronization pattern received matches one of the predetermined "A" word synchronization patterns within an acceptable margin of error, an "A" or "A-bar" output is generated and is coupled to controller 816. The particular "A" or "A-bar" word synchronization pattern correlated provides frame synchronization to the start of the frame ID word, and also defines the data bit rate of the message to follow, as was previously described.

The serial bit stream is also coupled to an input of a color code decoder 1340. Predetermined color code synchronization patterns are recovered by the controller 816 from the code memory 822 and are coupled to the color code decoder 1340. When the first synchronization pattern received matches one of the predetermined color code patterns within an acceptable margin of error, the margin being 3 in the present instance, a valid color code value, a 0, 1 or 2 in the present instance, is generated and is coupled to controller 816 for storage as the decoded color code value. When the results of the match are not within the acceptable margin of error, a predetermined value, 15 in this instance, indicating the recovery of a non-valid color code is generated and coupled to controller 816 for storage as the decoded color code value. The serial binary data stream is also coupled to an input of the frame word decoder 1320 which decodes the frame word and provides an indication of the frame number currently being received by the controller 816. During sync acquisition, such as following initial receiver turn-on, power is supplied to the receiver portion by battery saver circuit 848, shown in FIG. 10, which enabled the reception of the "A" synchronization word, as described above, and which continues to be supplied to enable processing of the remainder of the synchronization code. The controller 816 compares the frame number currently being received with a list of assigned frame numbers stored in code memory 822. Should the currently received frame number differ from an assigned frame numbers, the controller 816 generates a battery saving signal which is coupled to an input of battery saver circuit 848, suspending the supply of power to the receiver portion. The supply of power will be suspended until the next frame assigned to the receiver, at which time a battery saver signal is generated by the controller 816 which is coupled to the battery saving circuit 848 to enable the supply of power to the receiver portion to enable reception of the assigned frame.

Figure 11:
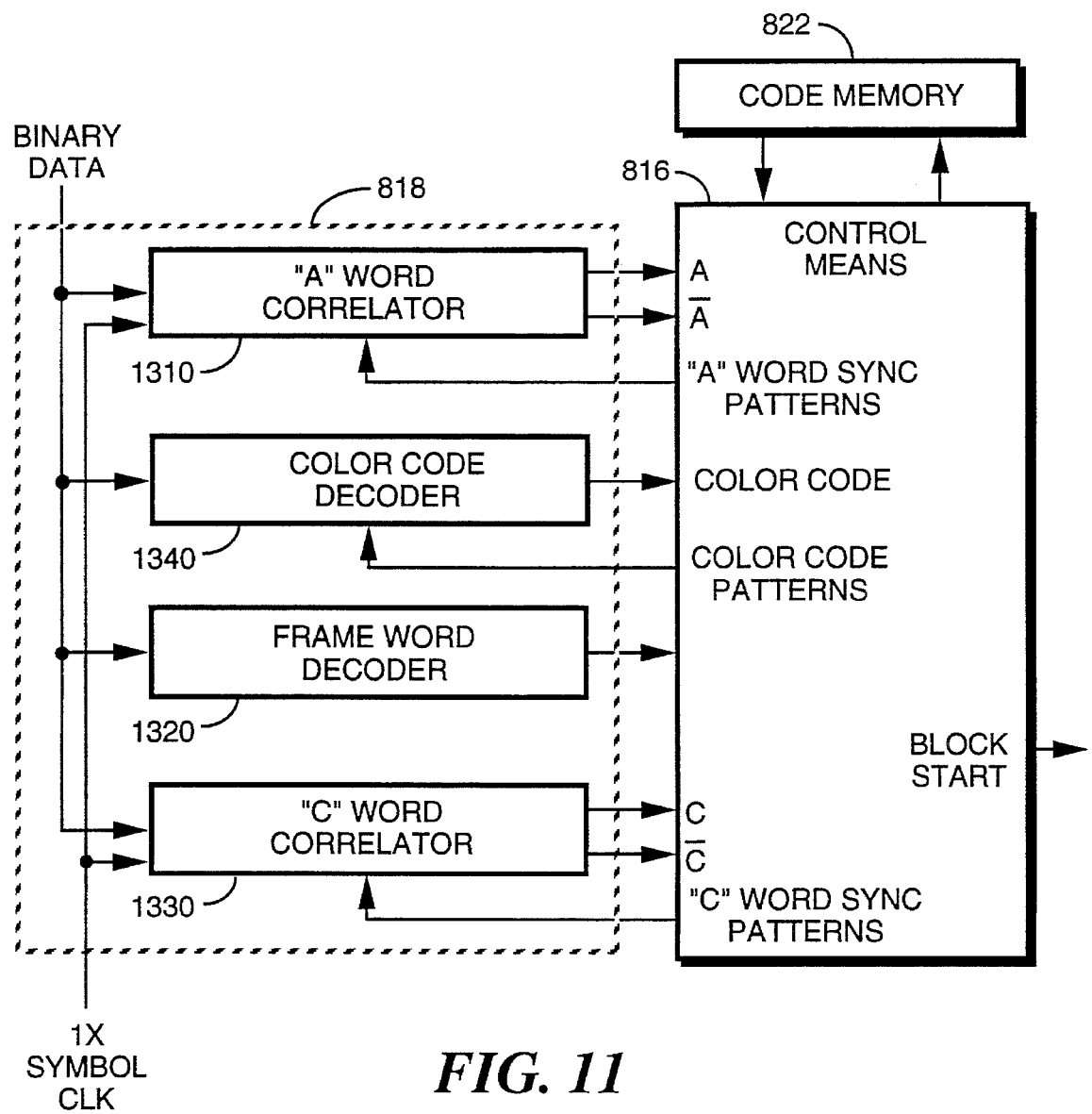
FIG. 11 is an electrical block diagram of a synchronization correlator utilized in the portable communication unit of FIG. 10.

Returning to the operation of the synchronization correlator shown in FIG. 11 a predetermined "C" word synchronization pattern is recovered by the controller 816 from the code memory 822 and is coupled to a "C" word correlator 1330. When the synchronization pattern received matches the predetermined "C" word synchronization pattern with an acceptable margin of error, a "C" or "C-bar" output is generated which is coupled to controller 816. The particular "C" or "C-bar" synchronization word correlated provides "fine" frame synchronization to the start of the data portion of the frame.

Returning to FIG. 10, the start of the actual data portion of the message is established by the controller 816 generating a block start signal (Blk Start) which is coupled to inputs of a block de-interleaver 824 and a data recovery phase clock generator 828. During operation, the controller 816 recovers from the code memory 822, the transmission phase number to which the portable communication unit 108 is assigned. The phase number is transferred to the phase select output (θ Select) of the controller 816 and is coupled to an input of phase clock generator 828. Using techniques well known to those skilled in the art, a phase clock, corresponding to the transmission phase assigned to the portable communication unit 108, is provided at the output of the phase clock generator 828 and is coupled to clock inputs of the demultiplexer 820, block de-interleaver 824, address correlator 830 and data decoder 832. The demultiplexer 820 is used to select the binary bits associated with the assigned transmission phase which are then coupled to the input of block de-interleaver 824, and clocked into the de-interleaver array on each corresponding phase clock. The de-interleaver array is preferably an 8×32 bit array which de-interleaves eight interleaved address, control or message code words, corresponding to one transmission block. The de-interleaved address code words are coupled to the input of address correlator 830. The controller 816 recovers the address patterns assigned to the portable communication units 108, and couples the patterns to a second input of the address correlator. When any of the de-interleaved address code words matches any of the address patterns assigned to the portable communication units 108 within an acceptable margin of error, the message and acknowledgment response information associated with the address is then decoded by the data decoder 832 and stored in a message memory 850 in a manner well known to one of ordinary skill in the art. Following the storage of the message information, a sensible alert signal is generated by the controller 816. The sensible alert signal is preferably an audible alert signal, although it will be appreciated that other sensible alert signals, such as tactile alert signals, and visual alert signals can be generated as well. The audible alert signal is coupled by the controller 816 to an alert driver 834 which is used to drive an audible alerting device, such as a speaker or a transducer 836. The user can override the alert signal generation through the use of user input controls 838 in a manner well known in the art.

Referring again to FIG. 10, the firmware 854 further comprises a reporter element 856 for reporting the last received decoded color code to at least one of the communication cells 500 in the acknowledgment response. As described herein above, the acknowledgment response information received with the message preferably further comprises a response time for controlling the initiation time of the response and a response channel defining the channel to be used for the response. The reporter element uses the input from a real-time clock 858 which is also coupled to the controller 816, the acknowledgment response information, and the last decoded color code value to generate the acknowledgment response in accordance with the channel and time information received with the message. The acknowledgment response is coupled to the encoder 860 where it is encoded for modulation and transmission by response transmitter 852 through antenna 802. It will be appreciated that designation of the response channel can be omitted in a system that utilizes a single response channel. It will be further appreciated that the designation of the response time can be omitted in a system that requires initiation of the response a fixed time interval after a marker transmitted in the information from the cell transmitter 104. It will be further appreciated that the designation of the response time can be eliminated in a system wherein the portable communication unit 108 includes its unique address in the acknowledgment response. It will be further appreciated that variations on the selection of color code value to be reported in the acknowledgment response exist. For example, the last valid color code value could be stored and sent instead of the last decoded color code value. Alternatively, the last valid color code value received (or the non-valid value, if no valid color code has been received) since the last acknowledgment response could be sent. Alternatively, the last valid color code value could be retained for a predetermined time, after which the non-valid code (or another unique value indicating a time-out) could be reported. The selection is influenced by the complexity of the portable, the frequency of messages, and the complexity of the system topography.

Returning again to FIG. 10, following the detection of an address associated with the portable communication unit 108, the message information is coupled to the input of data decoder 832 which decodes the encoded message information into preferably a BCD or ASCII format suitable for storage and subsequent display. The stored message information can be recalled by the user using the user input controls 838 whereupon the controller 816 recovers the message information from memory, and provides the message information to a display driver 840 for presentation on a display 842, such as an LCD display.

It will be appreciated that the elements of the portable communication unit 108, may be integrated as one or more contiguous integrated circuits.

Figure 12:
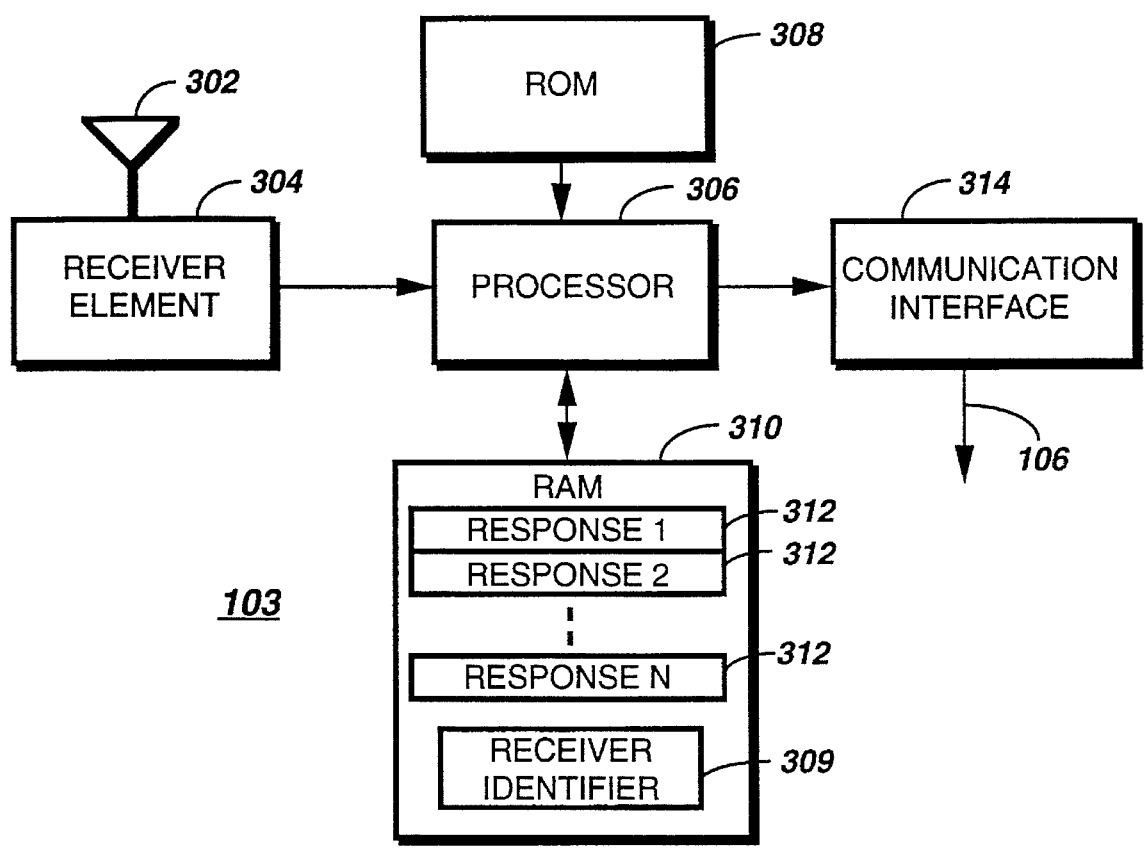
FIG. 12 is an electrical block diagram of a fixed receiver in a fixed communication unit in accordance with the preferred embodiment of the present invention.

Referring to FIG. 12, an electrical block diagram of one of the receivers 103 in the fixed communication units 101 in accordance with the preferred embodiment of the present invention comprises an antenna 302 for intercepting the responses from the portable communication units 108. A receiver element 304 is coupled to the antenna 302 for demodulating the intercepted responses. The receiver element 304 preferably is a conventional double-conversion RF receiver having a bandpass compatible with the narrowband responses from the portable communication units 108. The receiver element 304 is coupled to a processor 306 for processing the received demodulated responses. The processor 306 is preferably one of the MC68HC05C8 or C11 series microcomputers manufactured by Motorola, Inc. of Schaumburg, Ill. It will be appreciated that other similar processors can be used as well for the processor 306.

The processor 306 is coupled to a RAM 310 comprising memory locations 312 for storing the responses received by the receiver 103 and an identification code location 309 for storing the receiver identification code (RID) assigned at the time of system initialization. The processor 306 is further coupled to a ROM 308 comprising program instructions for the processor 306. The processor 306 is also coupled to a conventional communication interface 314, e.g., an RS-232 interface and modem, for communicating with the paging terminal 102 over one of the telephone lines 106 to report the received responses stored in the memory locations 312 along with the RID stored in the identification location 309. It will be appreciated that programmable read-only memory (PROM), EEPROM, EAROM, and other similar forms of non-volatile memory may be substituted as well for the ROM 308. It will be further appreciated that the RAM 310, the ROM 308, and the processor 306 may be integrated as one or more contiguous integrated circuits as well.

Figure 13:
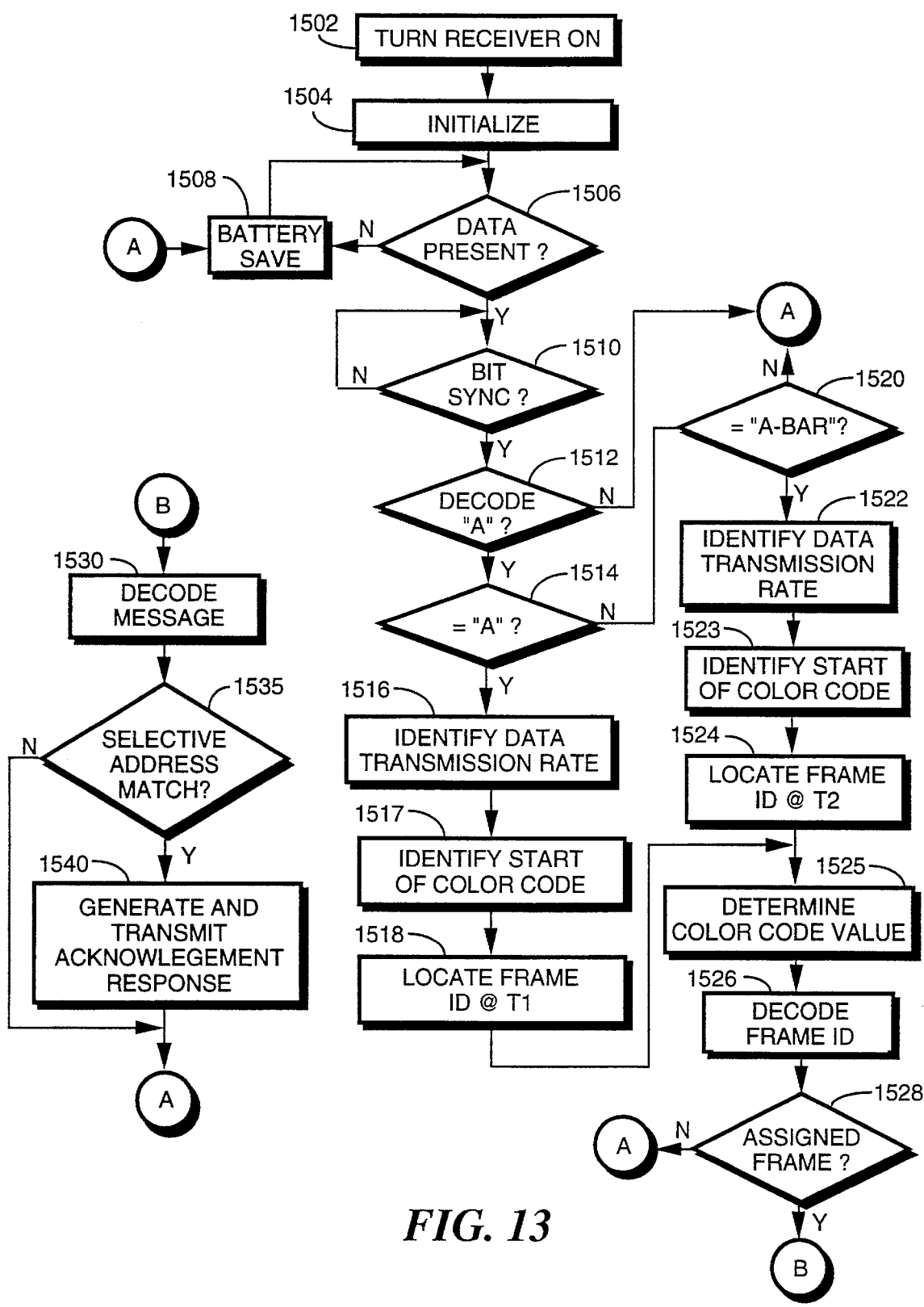
FIG. 13 is a flow chart illustrating the synchronization correlation sequence in accordance with the preferred embodiment of the present invention.

FIG. 13 is a flow chart illustrating the synchronization correlation sequence and acknowledgment process in the portable communication unit in accordance with the preferred embodiment of the present invention. At step 1502, when the portable communication unit 108 is turned on, the controller operation is initialized, at step 1504. Power is periodically applied to the receiver portion to enable receiving information present on the assigned RF channel. When data is not detected on the channel in a predetermined time period, battery saver operation is resumed, at step 1508. When data is detected on the channel, at step 1506, the synchronization word correlator begins searching for bit synchronization at step 1510. When bit synchronization is obtained, at step 1510, the "A" word correlation begins at step 1512. When the non-complemented "A" word is detected, at step 1514, the message transmission rate is identified as described above, at step 1516, and because frame synchronization is obtained, the starting bit of the color code portion of the first synchronization code is identified, at step 1517, and the time (T1) to the start of the frame identification code word is identified, at step 1518. When the non-complemented "A" word is not detected, at step 1514, indicating the non-complemented "A" word may have been corrupted by a burst error during transmission, a determination is made whether the complemented "A" bar" is detected, at step 1520. When the "A bar" word is not detected at step 1512, indicating that the "A-bar" word may also have been corrupted by a burst error during transmission, battery saver operation is again resumed, at step 1508. When the "A-bar" word is detected, at step 1520, the message transmission rate is identified as described above, at step 1522, and because frame synchronization is obtained, the starting bit of the color code portion of the first synchronization code is identified, at step 1523, and the time (T2) to the start of the frame identification code word is identified, at step 1524. At step 1525, the color code portion of the first synchronization pattern is tested by the color code decoder 1340 (FIG. 11), as described above, to determine the color code value which is reported in the next acknowledgment response generated by the portable communications unit, as described above. At the appropriate time, decoding of the frame identification word occurs, at step 1526. When the frame ID detected is not one assigned to the portable communication unit 108, at step 1528, battery saving is resumed, at step 1508, and remains so until the next assigned frame is to be received. When the decoded frame ID corresponds to an assigned frame ID, at step 1528, the message reception rate is set, the remaining portion of the synchronization pattern is received, and the message data is decoded, at step 1530. When a determination is made that the message includes the selective address of the portable communication unit 108, at step 1535, the acknowledgment response comprising the color code is generated by the reporter element 856 (FIG. 10) and transmitted by the portable communication unit 108 to the fixed receivers 103 at step 1540, after which the battery saver operation is again resumed, at step 1508. When a determination is made that the message does not include the selective address of the portable communication unit 108, at step 1535 the battery saver operation is again resumed, at step 1508.

Figure 14:
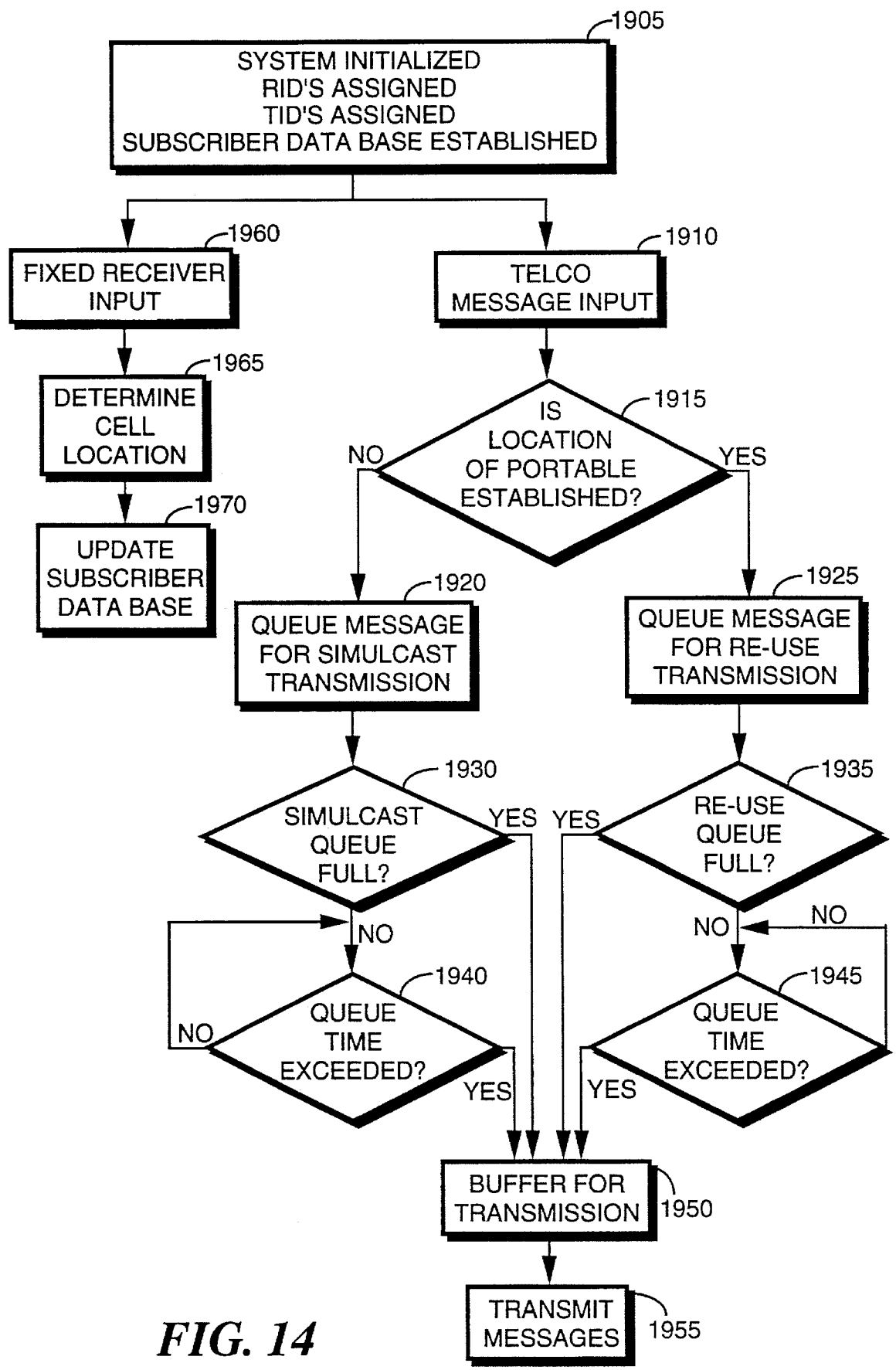
FIG. 14 is a flow chart illustrating the method of locating portable communication units and simultaneously re-using communication cell transmission resources in accordance with the preferred embodiment of the present invention.

FIG. 14 is a flow chart illustrating the method of locating portable communication units and re-using cell transmission resources in accordance with the preferred embodiment of the present invention. At step 1905, the system is initialized which comprises the assignment of the fixed receiver 103 identification codes (RID's), the cell transmitter 104 identification codes (TID's), and the establishment of the subscriber data base 208 including assigning the non-valid location value for all portable communication units 108. When messages are received at the paging terminal 102 at step 1910, a determination is made at step 1915 as to whether a cell location has been established for the portable communication unit 108 for which the message is designated. When a location has not been established, the message is queued at step 1920 in the simulcast queue for a simultaneous transmission according to system type, simulcast or conventional, as described above. When the simulcast queue is determined to be full at step 1930, or, when the simulcast queue is not full but a maximum queuing time has been exceeded, at step 1940, the queued messages are buffered at step 1950 for imminent transmission. When the queue is not full at step 1930 and the maximum queuing time has not been exceeded at step 1940, the simulcast queue is maintained at step 1940 awaiting additional simulcast messages. When a location is determined to be established in step 1915, the message is re-use queued at step 1925 for transmission only in the established cell location of the portable communication unit 108. When the re-use queue is determined to be full at step 1935, or, when the re-use queue is not full but a maximum queuing time has been exceeded, at step 1940, the queued messages are buffered at step 1950 for imminent transmission. When the re-use queue is not full at step 1935 and the maximum queuing time has not been exceeded at step 1945, the re-use queue is maintained at step 1945 awaiting additional re-use messages. It will be appreciated that there will exist simultaneously a number of re-use queues for different cell locations. At step 1950, messages for simulcast transmission are buffered with priority over any messages buffered for re-use transmission, putting the messages buffered for re-use transmission on hold until the simulcast message transmissions are completed at step 1955 (because the simulcast messages occupy all the transmitters). When messages from the simulcast queue are not being transmitted, messages from different re-use queues are simultaneously transmitted at step 1955 in the different cell locations, but not in adjacent cells. This avoids interference in coverage overlap regions during re-use transmissions. The preferred method in the present invention to control the interference of re-use transmissions is to perform the re-use transmissions simultaneously in cells with the same color code. The transmissions from transmitters within cells which have more than one transmitter will be the same simultaneous signal.

At step 1960, acknowledgment responses from the fixed receivers 103 are received at the paging terminal 102. For each acknowledgment response received, a determination is made at step 1965 of the selective address of the portable communication unit 108 which originated the acknowledgment response, as described above, and the reported color code, or the report of the non-valid color code. The subscriber data base 208 is then updated for the portable communication unit, in step 1970, using the best cell table as described above, herein.

It will be appreciated that the color code can be incorporated into other signaling protocols used in radio data communication systems by embedding the color code information into a portion of the transmitted signal that is recovered by all portable communication units which are capable of providing an acknowledgment response, thereby greatly enhancing the ability of the system to locate the portable communication units and therefore improving the efficiency of the use of the RF spectrum by allowing simultaneous re-use of frequencies. Robust codes which are recoverable under conditions arising in transmitter coverage overlap situations provide significantly better location determination than that achievable by the FM capture effect alone. The color code can be included in the bit synchronization portion of the protocol, in which case, as described above for the preferred embodiment, it can be chosen for optimum coexistence with the word synchronization functions. When the color code is included in a portion of the protocol that includes block or word synchronization, then the constraint of coexistence with the bit and word synchronization recovery functions is relaxed and a short and robust color code, still recoverable under coverage overlap conditions, can be used. The advantage of the color code described in the preferred embodiment is that no bits were added to the protocol because it was embedded in the already existing bit synchronization portion without substantially affecting the synchronization sensitivity and the color code error recovery provided is robust in coverage overlap situations. Even when the color code is added as a short word to the portion of the protocol that includes block or word synchronization, it is far more advantageous, particularly in large systems to use the color code rather than a complete transmitter or cell identification code because the length of a transmitter or cell code is much longer (e.g., two bits of information for four color codes versus eight bits for up to 256 cells). The longer identification code demands a much longer error correction word length to accomplish the desired robustness, which is a penalty both in the messages to the portable communication units and in the responses from the units. In some established protocols, it may be impractical to add the larger number of bits, or for that matter, any bits at all, making the preferred embodiment of the present invention described above as the only practical approach to attain the improvements described.

By now it should be appreciated that there has been provided a method and apparatus which greatly improves the efficiency of use of the RF spectrum in a radio communication system, and coincidentally, provides faster delivery of messages, by maximizing the ability of the system to re-use cells to communicate with different portable communication units simultaneously by determining the best cell locations of portable communication units, using color codes as a key element of making the location determination, and by also using the color codes to control the re-use transmissions. The capacity limits of a radio transmission system are thus increased in a manner that does not require additional radio channels.

It should be further appreciated that a method and apparatus for transmitting a error correcting color code in the synchronization portion of a signal without substantially affecting the synchronization performance of the signal and without lengthening the signal, has been provided

We claim:

1. A paging terminal for delivering messages to a plurality of portable communication units, wherein each portable communication unit has a transmitter for transmitting an acknowledge back signal and operates within a radio communication system, wherein the radio communication system comprises a plurality of communication cells and the paging terminal, and wherein each of the communication cells comprises one or more transmitters for transmitting information signals intended for reception by a portable communication unit and one or more fixed receivers coupled to the paging terminal for receiving an acknowledge back signal from said portable communication unit which is communicated to the paging terminal, the paging terminal comprising:

- transmitter controller means coupled to the one or more transmitters for transmitting a first information signal which comprises a color code word which identifies a subset of the plurality of communication cells for which radio coverage does not overlap;
- receiving controller means, coupled to the one or more fixed receivers, said receiving controller means for buffering said acknowledge back signal received at one of the one or more fixed receivers from said portable communication unit, and communicated to the receiving controller means, said acknowledge back signal comprising a reported color code value determined from said color code word transmitted in said first information signal;
- assignment means coupled to said receiver controller means for analyzing said acknowledge back signal for an identification of said one of the fixed receivers and determining a cell location of said portable communication unit from said reported color code value and the identification of said one of the fixed receivers, said assignment means comprising:
  - a subscriber data base, for storing said cell location in association with said portable communication unit; and
  - re-use means, coupled to said subscriber data base and to said transmitter controller means, for controlling transmissions of the information signals such that the same or differing information signals intended for portable communication units in differing cells with cell locations in said subscriber data base with the same color code are transmitted simultaneously.

2. The paging terminal according to claim 1, further comprising:

- set-up means coupled to said assignment means for assigning a non-valid cell location to said portable communication unit in said subscriber data base when no acknowledge back signal has been received from said portable communication unit, and
- wherein said re-use means further controls the transmissions of the information signals such that a second information signal intended for said portable communication unit is selected and transmitted simultaneously from all transmitters within a first subset of cells having a first color code when a non-valid cell location is assigned to said portable communication unit in said subscriber data base.

3. The paging terminal according to claim 2 wherein said re-use means further controls the transmissions of the information signals to transmit simultaneously from all transmitters within a second subset of cells having a second color code the second information signal when no acknowledge back signal is received in response to the transmission of the second information signal from the first subset of cells having the first color code.

4. The paging terminal according to claim 2, wherein the paging terminal is for use in a simulcast communication system, and wherein said re-use means further controls the transmissions of the information signals such that a second information signal intended for said portable communication unit is selected and transmitted simultaneously from all transmitters when a non-valid cell location is assigned to said portable communication unit in said subscriber data base.

5. A portable communication unit having a radio frequency (RF) receiver and an RF transmitter for transmitting an acknowledge back signal, and operating within a radio communication system comprising a plurality of communication cells and a paging terminal, and wherein each of the communication cells comprises one or more transmitters for transmitting an information signal intended for reception by said the portable communication unit, said portable communication unit comprising:

- demodulator means coupled to the RF receiver for demodulating said information signal, wherein said information signal includes a color code word which identifies a subset of the plurality of communication cells for which radio coverage does not overlap, and further includes one or more induced errors;
- sync correlator means coupled to said demodulator means for decoding one of a predetermined set of color code words of an error correcting code set from said information signal;
- reporter means coupled to said sync correlator means and said RF transmitter for generating said acknowledge back signal which includes a reported color code value determined from said one of said predetermined set of color code words and
- wherein said information signal comprises a bit synchronization code and an information message, and said color code word is within a first portion of the bit synchronization code, and wherein said sync correlation means comprises:
  - color code word pattern generator means for generating said predetermined set of color code words; and
  - color code decoder means coupled to said color code word pattern generator means and to said sync correlator means for matching said first portion of the bit synchronization code to a color code word of said predetermined set of color code words to determine a number of bits which mismatch and assigning, as said reported color code value, one of a plurality of pre-determined valid color code values associated one for one with the color code words of said predetermined set of color code words when the number of bits which mismatch is less than a predetermined number.

6. The portable communication unit according to claim 5, wherein said color code decoder means further assigns, as said reported color code value, a non-valid color code value other than all of said predetermined valid color code values, thereby indicating that a valid color code word could not be decoded, when the number of bits which mismatch is equal to or greater than the predetermined number of bits.

7. A method of delivering messages to a plurality of portable communication units, wherein each of said plurality of portable communication units has a receiver for receiving information signals and a transmitter for transmitting acknowledge back signals and operates within a radio communication system comprising a plurality of communication cells and a paging terminal having a subscriber data base within which cell locations are associated one to one with each of the plurality of portable communication units, wherein each of the communication cells comprises one or more transmitters coupled to the paging terminal for transmitting said information signals intended for reception by said plurality of portable communication units, and wherein each of the communication cells further comprises one or more fixed receivers coupled to the paging terminal for receiving the acknowledge back signals and communicating the acknowledge back signals to the paging terminal, said method comprising the steps of:

transmitting, to a portable communication unit from one of the plurality of communication cell transmitters, an information signal which includes a predetermined color code word which identifies a subset of the plurality of communication cells for which radio coverage does not overlap;

receiving at a fixed receiver an acknowledge back signal transmitted from said portable communication unit in response to said information signal received by said portable communication unit, said acknowledge back signal comprising a reported color code value determined from said predetermined color code word;

communicating said acknowledge back signal from the fixed receiver to the paging terminal; and analyzing said reported color code value in the paging terminal to determine a cell location of the portable communication unit, assigning to said portable communication unit within the subscriber data base of the paging terminal, said cell location which is identified in said analyzing step;

identifying a plurality of differing information signals intended for portable communication units in cells having cell locations not necessarily the same and having a common color code assigned within said subscriber data base; and simultaneously transmitting said plurality of differing information signals from the transmitters of cells having cell locations identified in said identifying step.

8. A method of locating a portable communication unit having a receiver for receiving an information signal and a transmitter for transmitting an acknowledge back signal, said portable communication unit operating within a radio communication system comprising a plurality of communication cells and a paging terminal, wherein each of the communication cells comprises one or more transmitters coupled to the paging terminal for transmitting said information signal, and wherein each of the communication cells further comprises one or more fixed receivers coupled to the paging terminal for receiving the acknowledge back signal and communicating the acknowledge back signal to the paging terminal, wherein said information signal comprises a bit synchronization code and an information message, the method comprising the steps of:

transmitting, to said portable communication unit from one of the plurality of communication cell transmitters, said information signal which includes a color code word within a first portion of the bit synchronization code, wherein said color code word identifies a subset of the plurality of communication cells for which radio coverage does not overlap;

receiving said information signal and one or more induced errors at said portable communication unit;

decoding, in said portable communication unit, said color code word from said information signal and the one or more induced errors, said step of decoding further comprising the steps of:

matching said first portion of the bit synchronization code containing said color code word to one color code word of a set of predetermined color code words to determine a number of bits which mismatch; and assigning, as a reported color code value, one of a plurality of predetermined valid color code values associated one for one with said set of predetermined color code words when the number of bits which mismatch is less than a predetermined number of bits in said matching step;

transmitting from said portable communication unit said acknowledge back signal including said reported color code value determined from said color code word;

receiving at a fixed receiver said acknowledge back signal;

communicating said acknowledge back signal from the fixed receiver to the paging terminal; and analyzing, in the paging terminal, said reported color code value to determine a cell location of the portable communication unit.

9. The method according to claim 8 wherein said step of assigning further comprises assigning, as said reported color code value, a non-valid color code value different than all of said predetermined valid color code values, indicating that a valid color code word could not be decoded, when said matching step results in a mismatch equal to or greater than the predetermined number of bits.

10. In a portable communication unit having a receiver for receiving information signals and a transmitter for transmitting acknowledge back signals, and operating within a radio communication system comprising a plurality of communication cells and a paging terminal, wherein each of the communication cells comprises one or more transmitters for transmitting an information signal intended for reception by said portable communication unit, a method of identifying a subset of the plurality of communication cells for which radio coverage does not overlap, wherein said information signal includes a color code word which identifies said subset, and wherein said information signal comprises a bit synchronization code and an information message, and said color code word is within a first portion of the bit synchronization code, the method comprising the steps of:

receiving at said portable communication unit said information signal and one or more induced errors;

decoding said color code word from said information signal and the one or more induced errors, said step of decoding further comprising the steps of:

matching said first portion of the bit synchronization code to one color code word of a predetermined set of color code words to determine a number of bits which mismatch; and assigning, as a reported color code value, one of a plurality of pre-determined valid color code values associated one for one with the color code words of said predetermined color code words when the number of bits which mismatch is less than a predetermined number; and transmitting from said portable communication unit, for communication to said paging terminal, an acknowledge back signal comprising said reported color code value determined from said color code word decoded in said decoding step.

11. The method according to claim 10 wherein said step of assigning further comprises assigning, as said reported color code value, a non-valid color code value different than all of said predetermined valid color code values, thereby indicating that a valid color code word could not be decoded, when said matching step results in a mismatch equal to or greater than the predetermined number of bits.

\* \* \* \* \*